United States Patent [19]

Pasco et al.

[11] Patent Number: 4,581,303
[45] Date of Patent: Apr. 8, 1986

[54] PROCESS FOR MAKING STRUCTURE FOR A MCFC

[75] Inventors: Wayne D. Pasco, Scotia; Ronald H. Arendt, Schenectady, both of N.Y.

[73] Assignee: The United States of America as represented by the United States Department of Energy, Washington, D.C.

[21] Appl. No.: 719,653

[22] Filed: Apr. 3, 1985

[51] Int. Cl.$^4$ ............................................. H01M 8/14
[52] U.S. Cl. ...................................... 429/46; 429/188; 429/189
[58] Field of Search .................. 429/188, 189, 46, 41, 429/16, 112; 29/623.1; 423/421, 430; 252/62.2, 182.1

[56] References Cited

U.S. PATENT DOCUMENTS

| | | | |
|---|---|---|---|
| 3,466,197 | 9/1969 | Bawa | 429/46 |
| 4,115,632 | 9/1978 | Kinoshita et al. | 429/188 |
| 4,216,278 | 8/1980 | Arendt et al. | 429/188 |
| 4,279,971 | 7/1981 | Arendt | 429/46 |
| 4,317,865 | 3/1982 | Trocciola | 429/16 X |

OTHER PUBLICATIONS

Arendt, Alternate Matrix Material for Molten Carbonate Fuel Cell Electrolyte Structures, J. Electrochem. Soc., vol. 129, No. 5, pp. 979–983, May, 1982.

Primary Examiner—Anthony Skapars
Attorney, Agent, or Firm—Hugh W. Glenn; Robert J. Fisher; Judson R. Hightower

[57] ABSTRACT

A process of making a porous carbonate-containing structure for use in a molten carbonate fuel cell, wherein a suitable porous structure is prepared having disposed therein a metal salt selected from the alkali metals and the alkaline earth metals or mixtures thereof with at least a portion of the salt being a monobasic organic acid salt. The monobasic acid salt is converted to the carbonate in situ by heating in the presence of oxygen. Both electrode and electrolyte structures can be prepared. Formic acid is preferred.

19 Claims, No Drawings

PROCESS FOR MAKING STRUCTURE FOR A MCFC

CONTRACTUAL ORIGIN OF THE INVENTION

The United States Government has rights in this invention pursuant to Contract No. DE-AC02-80ET17019 between the U.S. Department of Energy and General Electric Corporate Research and Development.

BACKGROUND OF THE INVENTION

The present invention relates to the preparation of structures for use in molten carbonate fuel cells. Generally, molten carbonate fuel cells are comprised of a cathode, an anode, and an electrolyte structure disposed between the cathode and the anode. The electrolyte structure is composed of carbonate electrolyte and a supporting matrix. Under fuel cell operating conditions, at temperatures usually in the range of from about 500° C. to about 700° C., the supporting matrix acts to retain, by capillary action, the electrically active molten carbonate between the cell electrodes. The present invention relates to both the preparation of electrode structures as well as the electrolyte structure.

Fuel cells employing molten carbonate electrolyte can accept various carbonaceous gases as fuels. For example, methanol and carbon monoxide along with hydrogen have been proposed. One source of a fuel gas is that produced in the gasification of coal which includes carbon dioxide, carbon monoxide and hydrogen. In such a cell, the following reactions occur. At the anode:

$$H_2 + CO_3^- \rightarrow CO_2 + H_2O + 2e^-$$

$$CO + CO_3^- \rightarrow 2CO_2 + 2e$$

At the cathode:

$$2e^- + CO_2 + \tfrac{1}{2}O_2 + 2e^- \rightarrow CO_3^-$$

The carbon dioxide gas required at the cathode can be provided from that produced at or delivered to the anode, all as well known in the Kinoshita et al. U.S. Pat. No. 4,115,632 issued Sept. 19, 1978 for METHOD OF PREPARING ELECTROLYTE FOR USE IN FUEL CELLS, the disclosure of which is incorporated herein by reference and the Arendt et al. U.S. Pat. No. 4,216,278 issued Aug. 15, 1980 for PROCESS OF MAKING ELECTROLYTE STRUCTURE FOR MOLTEN CARBONTE FUEL CELLS, the disclosure of which is incorporated herein by reference.

The active electrolyte material is generally provided as a mixture of molten alkali metal carbonates or mixtures of alkali metal carbonates and alkaline earth carbonates at the cell operating temperature. Considerable reduction in melting temperatures can be obtained by using eutectics and other molten mixtures of the carbonates, as is well known in the art.

Molten carbonate fuel cells have been suggested as stacks of repeating elements. Each element contains an anode, a cathode with an electrolyte structure or compact separating the two. Anode structures can include porous, sintered nickel possibly alloyed with chromium or cobalt. Suitable means of current collection and an electrically conductive separator plate between the anode and the next cell in the stack are incorporated. Cathodes of similar structure are contemplated of, for instance, porous nickel oxide prepared within the cell by oxidation of sintered nickel structures. The electrolyte structure disposed between the electrodes includes the active electrolyte material of metal carbonates along with an inert matrix or substrate material. The alkali metal aluminates particularly lithium aluminate are currently of interest for use as this inert substrate material. The formation of lithium aluminate ($LiAlO_2$) is favored relative to sodium or potassium because of its greater stability. Another inert substrate material commonly used in carbonate fuel cells is strontium titanate ($SrTiO_3$). One of the principal problems in fabricating either electrodes or electrolyte compacts for carbonate fuel cells has been the cracking of the structure upon cooling after introduction of the carbonate into the matrix. This in part is due to the fact that the coefficient of expansion or contraction of the matrix is different than the carbonates, that is the volume change on solidification of the molten electrolyte coupled with the differential thermal expansion between the matrix material and the electrolyte material are the primary causes of distortion and cracking. Therefore, in view of the problems associated with the prior art methods of preparing carbonate containing structures for use in molten carbonate fuel cells, it is an object of the present invention to provide a process for making porous carbonate-containing structures for use in molten carbonate fuel cells which prevents the cracking and distortion of the matrix material upon cooling.

It is a further object of the present invention to provide a process for producing such carbonate containing structures than is applicable to the electrolyte compacts as well as the electrode structures. It is also an object to provide a process which is operable with inexpensive materials with ordinary operating temperatures without the need of exotic equipment.

SUMMARY OF THE INVENTION

The present invention involves a process of making a porous carbonate-containing structure for use in a molten carbonate fuel cell comprising preparing a suitable porous structure having therein a metal salt selected from the alkali metals and the alkaline earth metals or mixtures thereof wherein at least a portion of the salt is a monobasic organic acid salt, and converting the monobasic acid salt to the carbonate in situ.

A more specific aspect of the invention is a process of making a porous carbonate containing electrolyte structure for use in the molten carbonate fuel cell is provided comprising preparing a slurry of a suitable matrix material and a metal salt selected from the alkali metals or the alkaline earth metals or mixtures thereof wherein at least a portion of the salt is a monobasic organic acid salt, drying the slurry to form a mixture of matrix particulates and particulates including a monobasic organic acid salt of an alkali metal or an alkaline earth metal or mixtures thereof, forming a particulate mixture into an electrolyte structure under suitable pressure, and converting the monobasic acid salt to the carbonate in situ.

Yet another aspect of the invention is a process of making a porous carbonate containing electrode structure for use in a molten carbonate fuel cell is provided comprising preparing a suitable porous electrode structure, preparing a liquid salt selected from the alkali metals or the alkaline earth metals or mixtures thereof wherein at least a portion of the salt is a monobasic organic acid salt, introducing the liquid salt into the porous electrode structure, and converting the monobasic acid salt to the carbonate in situ.

Additional objects, advantages and novel features of the invention will be set forth in part of the description which follows, and in part will become apparent to those skilled in the art upon examination of the following or may be learned by practice of the invention. The objects and advantages of the invention may be realized and attained by means of the instrumentalities and combinations particularly pointed out in the appended claims.

DETAILED DESCRIPTION OF THE PREFERRED EMBODIMENT

The thin tile approach to molten carbonate fuel cells requires the introduction of electrolyte into the anode, the cathode and the electrolyte holding tile therefor, the electrolyte must be stored either in the anode, the cathode, the anode flow field or the cathode flow field. Past experience has revealed cracking and curling problems when trying to prefill an anode with electrolyte by heating above the carbonate liquidus and allowing capillary action to draw the liquid in the anode structures. The problem arises upon cooling where the electrolyte has about twenty (20) volume percent reduction on solidification.

The alternate approach of the present invention is to replace the $CO_3^=$ anion with one that gives a lower liquidus temperature, in order to permit the introduction of carbonate into the various structures without heating above the liquidus temperature of the carbonate. This can be accomplished by replacing the $CO_3^=$ anion with the anion of the monobasic organic acid, the preferred acid being formic acid. For instance, the alkali metal/alkaline earth formate melt individually at least than 470 K. and the mixtures should be at least partially liquid at far lower temperatures.

In one aspect of this invention, a melt of lithium and potassium formate which contains the appropriate cation proportions to yield a composition of 62 mole percent lithium carbonate and 38 mole percent potassium carbonate following conversion of the formate to the carbonate was prepared. The anode was dipped into the formate melt at a temperature of about 463 K. for approximately two minutes to allow the formate to be drawn into the anode by capillary action. The liquid formate was converted to the solid carbonate by heating in air at a temperature of about 533 K. for approximately 48 hours, thereby producing an anode with approximately fifty percent of the porosity filled with carbonate, without encountering the problems of carbonate solidification of the prior art.

In another aspect of the invention, a nominal electrolyte phase comprising 62 mole percent lithium carbonate-28 mole percent potassium formate and 10 mole percent strontium formate was used with a matrix of strontium titanate. The appropriate quantities of alkali/alkaline earth formates were prepared as aqueous solutions using well known neutralization techniques. To this solution was added the matrix material as well as the lithium carbonate. This mixture was briefly wet milled with dense zirconium dioxide balls in a polyethylene jar to disaggregate and disperse the solid phases. After quantitative retrieval of the milled mixture, its volume was reduced by evaporation so that 0.50 kg of composite mixture, on a carbonate basis, was contained in one $dm^3$. This mixture was added drop wise to a vessel filled with liquid nitrogen and rapidly frozen, after which the solid mixture was transferred to a laboratory freezer where water was removed by sublimation. Drying was completed by heating overnight in a vacuum oven at 360 K. After drying, the material was lightly comminuted to pass through a forty mesh nylon screen.

A graphite coated normal tool-steel die in a convection oven was heated to the desired pressing temperature ranging from approximately 330 K. to about 420 K. The die was placed in the press and loaded with the appropriate quantity of the formate composite mixture and pressed for five minutes at pressures ranging from 3 to 42 MPa, most typically approximately 15 MPa. The enthalpy of the massive steel dies was adequate to maintain the sample temperature within reasonable limits for the duration of the process. The pressed body was then removed from the die and stored in a vacuum oven at 330 K.

Conversion of the formate to the carbonate was accomplished by heating in air according to the following schedule. From room temperature to 423 K. at the rate of 40 K. per hour, from 423 K. to 523 K. at the rate of 17 K. per hour and held at 523 K. for twelve hours. Thereafter, the atmosphere was changed to pure nitrogen and heating was continued to 923 K. at the rate of increase of 65 K. per hour and held for one hour at 923 K. before furnace cooling to room temperature. Using this procedure, it was possible to prepare a crack-free structure.

In another aspect of the invention, 307.85 g $SrTiO_3$ (chloride synthesized) was wet milled in 1000 ml distilled water in a ½ gallon polyethylene jar, half filled with ⅜" diameter $ZrO_2$ balls for 1 hr. 28.57 g of $SrCO_3$ was added to the $SrTiO_3$ slurry followed by the dropwise addition of HCOOH to convert $CO_3^{-2}$ to $HCOO^-$. Then, 100.71 g of $LiOH.H_2O$ and 70.72 g of KOH (86% pure) were dissolved in the slurry followed by the drop-wise addition of 148 ml HCOOH. The slurry was back titrated to phenolphtalene end point with both $LiOH.H_2O$ and $KOH.XH_2O$. The slurry was then placed in a 413 K. oven to reduce the water volume from 1500 ml to 800 ml.

The slurry was then dripped into a liquid nitrogen bath to freeze in the homogeneous dispersion of $SrTiO_3$ and Li/K/Sr formate. The frozen composite mixture was then placed in a freeze drier until all water was removed. To insure complete removal of water, the product was placed in a vacuum oven at 333 K. for ~16 hours. The fully dried product was then passed through a 40 mesh nylon screen to yield a reasonably flowable powder which could be pressed.

A steel die measuring 3"×6½" was placed in an oven at 348 K. overnight. The die was removed from the oven and loaded with the composite mixture which was at room temperature and pressed at ~40 MPa for 5 minutes. The long dwell time enabled the heat from the steel die to transmit to the composite mixture which softened the formates and enabled flow to occur, thus producing a dense electrolyte structure. Satisfactory pressings were also achieved with a die temperature of 358 K.

In another aspect of the invention, an electrolyte structure was fabricated by filling the dies with the aforementioned combination matrix material in particulate form wherein the best results were achieved with a composite mixture containing 67 volume percent electrolyte on a carbonate anion basis with 62 mole percent lithium carbonate, 28 mole percent potassium formate and 10 mole percent strontium formate. The matrix portion of the mixture was composed of 75 weight percent strontium titanate with an average crystal size of 1.7 $\mu$m and a 25 percent strontium titanate with a 0.25 $\mu$m size. The mixture was pressed at 368 K. and 13.8 MPa for five minutes. Conversion of the formate ion to the carbonate ion was accomplished by heating the body in a flowing air atmosphere at the aforementioned schedule.

The prefilling of the anode structure by the process of this invention involves preparing a lithium-potassium formate aqueous solution which is heated to drive off water to yield the lithium-potassium formate melt. The anodes, which may be sintered nickel metal, were dipped into the formate melt at a temperature of approximately 463 K. for 2–3 minutes to draw the formates into the anode structure by capillary action. The filled anodes were then placed in a conversion dryer and slowly heated to approximately 533 K. to convert the formate to the carbonate, it being understood that air was present for the conversion. This temperature gave complete conversion to the carbonate and was sufficiently low as not to oxidize the anode. Advantages of the present invention are that the liquid formate decomposes directly to solid carbonate thereby avoiding cracking and curing of the anode which has heretofore been experienced.

Summarizing, the process is applicable to making various carbonate containing structures for use in molten carbonate fuel cells. Anodes, cathodes as well as electrolyte tiles have been prepared by the inventive process. Fundamentally, the process involves conversion of a monobasic acid salt in situ to carbonate at temperatures below the melting point of the carbonate, thereby avoiding the previous problems encountered with cracking and curling of structures upon solidification of the carbonate. The process is useful with a variety of electrolyte materials selected from the alkali metals, the alkaline earth metals or mixtures thereof and may be used in combination with mixtures of alkali metal carbonates, alkaline earth carbonates and the various salts of monobasic organic acids. The matrix material for the electrolyte structures may be any art recognized materials although lithium aluminate and strontium titanate are preferred.

Although what has been described is considered to be the preferred embodiment of the present invention, it will be appreciated that various modification and alterations may be made therein without departing from the true scope and spirit of the present invention and it is intended to cover within the claims appended hereto all such variations and modifications.

The embodiments of the invention in which an exclusive property or privilege is claimed are defined as follows:

1. A process of making a porous carbonate, containing structure for use in a molten carbonate fuel cell, comprising preparing a suitable porous structure having therein a metal salt selected from the alkali metals and the alkaline earth metals or mixtures thereof wherein at least a portion of the salt is a monobasic organic acid salt, and converting the monobasic acid salt to the carbonate in situ.

2. The process of claim 1, wherein the monobasic organic acid is formic acid and the salt thereof includes an alkali metal formate and an alkaline earth formate.

3. The process of claim 2, wherein the salt includes lithium or potassium formate.

4. The process of claim 1, wherein the porous carbonate containing structure includes a ceramic matrix including $LiAlO_2$, $SrTiO_3$ or mixtures thereof.

5. The process of claim 1, wherein the carbonate containing structure is an anode.

6. The process of claim 1, wherein the monobasic acid salt is converted to the carbonate in situ by heating above the liquidus temperature of the acid salt in the presence of oxygen.

7. The process of claim 1, wherein the monobasic acid salt includes an alkali metal formate and an alkaline earth formate and is heated in the presence of oxygen to a temperature in the range of from about 473 K. to about 523 K. to convert the formate to the carbonate.

8. The process of claim 1, wherein the suitable porous structure has therein a combination of an alkali metal carbonate, an alkali metal salt of a monobasic organic acid and an alkaline earth salt of a monobasic organic acid prior to the conversion of the acid salts to the carbonate in situ.

9. A process of making a porous carbonate-containing electrolyte structure for use in a molten carbonate fuel cell, comprising preparing a slurry of a suitable matrix material and a metal salt selected from the alkali metals or the alkaline earth metals or mixtures thereof wherein at least a portion of the salt is a monobasic organic acid salt, drying the slurry to form a mixture of matrix particulates and particulates including a monobasic organic acid salt of an alkali metal or an alkaline earth metal or mixtures thereof, forming the particulate mixture into an electrolyte structure under suitable pressure, and converting the monobasic acid salt to the carbonate in situ.

10. The process of claim 9, wherein the matrix material is particulate $SrTiO_3$, $LiAlO_2$, or mixtures thereof.

11. The process of claim 9, wherein the monobasic organic acid salt includes an alkali metal formate and an alkaline earth formate.

12. The process of claim 9, wherein the slurry is aqueous and includes a suitable matrix material, an alkali metal carbonate, an alkali metal formate and an alkaline earth formate.

13. The process of claim 12, wherein the salt portion of the slurry is 62 mole percent lithium carbonate and 28 mole percent potassium formate and 10 mole percent strontium formate.

14. A process of making a porous carbonate-containing electrode structure for use in a molten carbonate fuel cell, comprising preparing a suitable porous electrode structure, preparing a liquid salt selected from the alkali metals or the alkaline earth metals or mixtures thereof wherein at least a portion of the salt is a monobasic organic acid salt, introducing the liquid salt into the porous electrode structure, and converting the monobasic acid salt to the carbonate in situ.

15. The process of claim 14, wherein the porous electrode structure is a sintered metal and the monobasic organic acid is formic acid.

16. The process of claim 15, wherein the liquid salt introduced into the porous electrode structure includes a mixture of carbonate and formate.

17. The process of claim 16, wherein the liquid salt introduced into the porous electrode structure includes lithium carbonate, potassium formate and strontium formate.

18. The process of claim 14 wherein the liquid salt is introduced into the porous electrode structure by dipping the electrode structure into the liquid salt, thereby permitting the liquid salt to enter the electrode structure due to capillary action.

19. The process of claim 14, wherein the monobasic acid salt is converted to the carbonate in situ by heating in the presence of oxygen to a temperature in excess of the liquidus temperature of the acid salt.

* * * * *